US012749684B2

(12) United States Patent
Tian et al.

(10) Patent No.: US 12,749,684 B2
(45) Date of Patent: Sep. 29, 2026

(54) BINDER COMPOSITIONS COMPRISING STYRENIC BLOCK COPOLYMERS FOR RECHARGEABLE BATTERIES

(71) Applicant: Notark Corporation, Houston, TX (US)

(72) Inventors: Jason Tian, Houston, TX (US); Xiangyun Wei, Houston, TX (US); John Flood, Houston, TX (US); Vijay Mhetar, Houston, TX (US)

(73) Assignee: Notark Corporation, The Woodlands, TX (US)

( * ) Notice: Subject to any disclaimer, the term of this patent is extended or adjusted under 35 U.S.C. 154(b) by 562 days.

(21) Appl. No.: 18/262,574

(22) PCT Filed: Jan. 24, 2022

(86) PCT No.: PCT/US2022/070317
§ 371 (c)(1),
(2) Date: Jul. 23, 2023

(87) PCT Pub. No.: WO2022/159979
PCT Pub. Date: Jul. 28, 2022

(65) Prior Publication Data
US 2024/0304815 A1 Sep. 12, 2024

Related U.S. Application Data

(60) Provisional application No. 63/140,892, filed on Jan. 24, 2021.

(51) Int. Cl.

| | |
|---|---|
| ***H01M 4/62*** | (2006.01) |
| ***H01M 4/1393*** | (2010.01) |
| ***H01M 4/1395*** | (2010.01) |
| ***H01M 4/38*** | (2006.01) |
| ***H01M 4/583*** | (2010.01) |

(52) U.S. Cl.
CPC ......... *H01M 4/622* (2013.01); *H01M 4/1393* (2013.01); *H01M 4/1395* (2013.01); *H01M 4/386* (2013.01); *H01M 4/583* (2013.01)

(58) Field of Classification Search
CPC .. H01M 4/622; H01M 4/1393; H01M 4/1395; H01M 4/386; H01M 4/583
See application file for complete search history.

(56) References Cited

U.S. PATENT DOCUMENTS

| | | | | |
|---|---|---|---|---|
| 5,726,239 | A | 3/1998 | Maes et al. | |
| 6,699,941 | B1 * | 3/2004 | Handlin | C08F 8/04 526/79 |
| 2007/0225428 | A1 * | 9/2007 | Bening | C08L 51/006 524/505 |
| 2020/0255574 | A1 * | 8/2020 | Ishii | C08F 297/046 |

FOREIGN PATENT DOCUMENTS

| | | | |
|---|---|---|---|
| EP | 3960780 | A1 | 3/2022 |
| JP | H10152540 | A | 6/1998 |
| WO | 2015153747 | A1 | 10/2015 |

OTHER PUBLICATIONS

Hara T et al: "New Binding Materials for Metal Hydrise Electrodes Which Permit Good Recycleability", Journal of the Electrochemical Society, vol. 140, No. 9, Sep. 1, 1993, pp. 2450-2454, XP000424101, ISSN: 0013-4651.

Rehner et al: "Determination of Unsaturation in Butyl Rubber", Industrial & Engineering Chemistry Analytical Edition, vol. 17, No. 6, Jun. 1, 1945, pp. 367-370, XP055914482, ISSN: 0096-4484, DOI: 10.1021/i560142a006 URL:http://dx.doi.org/10.1021/i560142a006.

Smolentseva I I et al: "Determination of Unsaturation Level, Halogen Content, and Main Forms of Isoprene Units in Halogenated Butyl Rubbers by1H NMR Spectroscopy", Journal of Applied Spectroscopy, New York, NY, US, vol. 82, No. 3, Jul. 19, 2015, pp. 465-469, XP035524068, ISSN: 0021-9037, DOI: 10.1007/S10812-015-0131-Y.

Nicolas Fedelich: "Application Handbook Thermal Analysis of Polymers Selected Applications Thermal Analysis", Jan. 1, 2013 (Jan. 1, 2013), XP055608279, URL:https://www.mt.com/dam/LabDiv/guides-glen/ta-polymer/TA_Polymers_Selected_Apps_EN.pdf.

Thomas: "GPC/SEC Practical Tips and Tricks", Oct. 1, 2011 (Oct. 1, 2011), XP055608344, URL:https://www.agilent.com/cs/library/slidepresentation/Public/GCC2011-Wksp_GPC_Tips-and-Tricks_Presentation.pdf.

"A Basic Guide to Particle Characterization", Malvern Instruments Worldwide—White Paper, May 2, 2012, pp. 1-26, XP055089322, URL:http://golik.co.il/Data/ABasicGuidtoParticleCharacterization(2)_1962085150.pdf.

Eunice K Wong et al: "Battery Separator Characterization and Evaluation Procedures for NASA's Advanced Lithium-Ion Batteries", May 1, 2010, XP055608606, URL:https://ntrs.nasa.gov/archive/nasa/casi.ntrs.nasa.gov/20100021170.pdf.

* cited by examiner

*Primary Examiner* — Jimmy Vo

(57) ABSTRACT

An electrode binder for use with rechargeable batteries is disclosed. In embodiments, the electrode binder comprises a styrenic block copolymer (SBC) for use with an electrode active material, such as Si, Si alloys, Si compounds, Si composites, carbon black, or graphite in an amount of at least 20 wt. %. The SBC can be unsaturated (USBC) or hydrogenated (HSBC), or functionalized, wherein functionality includes maleation, epoxidation, silanation, carboxylic acid/salt, quaternary ammonium salt, sulfonation and others. In embodiments, the electrode binder is selected from isoprene rubber (IR), silicone-containing block copolymer, and an electronically conductive block copolymer containing a block that is unhydrogenated CHD (cyclohexadiene) block.

18 Claims, No Drawings

BINDER COMPOSITIONS COMPRISING STYRENIC BLOCK COPOLYMERS FOR RECHARGEABLE BATTERIES

RELATED APPLICATIONS

This application claims benefit to U.S. Provisional Application No. 63/140,892, with a filing date of Jan. 24, 2021, the entire disclosure is incorporated herein by reference.

FIELD

The disclosure relates to binders for use in electrodes and/or electrolyte in rechargeable batteries.

BACKGROUND

Rechargeable batteries, e.g., Lithium ("Li") ion batteries, have become an indispensable part of modern life, widely used in applications including but not limited to cell phones, computers, tablets, power tools, transportation, energy storage and others. The ion moves through an electrolyte from negative to positive during discharge, and in reverse during recharge. Rechargeable batteries have a few key components: a cathode (positive electrode), an anode (negative electrode), a separator and an electrolyte mixture as a conductor. The electrochemical reactions that generate voltage and current are facilitated at the coated electrodes, where reduction and oxidation reactions occur. High-capacity (negative) electrodes for batteries with recharge cycle capability and energy density are needed for plug-in electric vehicles with extended mileage range between charging.

In the making of battery electrodes, binder is important for mechanical stabilization and electrical conduction. In a typical electrode manufacturing process, electrode active material(s) such as Si, or Si based materials, filler(s), and binder(s) are blended to form a paste, which is then coated onto a current collector, either aluminum or copper foil. Subsequent drying, calendaring, and slitting produces electrode reeling stock, which is then used for battery construction. The key function of electrode binder is to hold electrode particles and fillers together, throughout both battery manufacture process and actual battery usage, especially through many charge/discharge cycles. For some high-capacity electrodes, such as Si, Si alloys, Si compounds or Si composite anode, electrode volume expansion/contraction during charge/discharge cycle is significant, up to 300% or more, requiring binder materials that can tolerate large electrode volume expansion/contraction during charge/discharge cycle.

Rechargeable batteries contain a binder material in the solid-state electrolyte, which can be any of liquid, gel, solid, or film. Liquid electrolyte generally requires packaging in rigid hermetically sealed metal "cans" which can reduce energy density. Gel polymer electrolytes in the prior art cannot generally operate over a broad temperature range because gel freezes at low temperatures and reacts with other battery components or melts at elevated temperatures.

There is still a need for improved binder materials for use in rechargeable batteries, in electrodes and/or electrolyte.

SUMMARY

In embodiments, the disclosure relates to a binder composition for use in rechargeable batteries. The binder composition comprises, consists essentially of, or consists of: at least 20 wt. % of a styrenic block copolymer (SBC) having any of a linear, radial, or branched structure, up to 70 wt. % of a tackifying agent selected from hydrocarbon resins, alkyd resins, rosin resins, rosin esters and combinations thereof, and up to 40 wt. % of a plasticizer selected from vegetable oils, mineral oils, process oils, phthalates, and mixtures thereof. The SBC comprises, consists essentially of, or consists of: a) a monovinyl aromatic compound polymer block, b) at least one of a cyclo-conjugated diene polymer block and a conjugated diene polymer block, and c) optionally a coupling agent residue. The SBC has a residual unsaturation of 0.5-25 meq/g.

In embodiments, the SBC is unhydrogenated, or hydrogenated selectively, fully, or partially.

In embodiments, the SBC is functionalized for a functionality selected from the group of maleation, epoxidation, silanation, carboxylic acid/salt, quaternary ammonium salt, and sulfonation.

In embodiments, an electrode composition is disclosed. The electrode composition comprises, consists essentially of, or consists of: an electrode active material, a filler, and a binder as disclosed herein. The electrode active material is selected from Si, Si alloys, Si compounds, Si composites, carbon black, and graphites, accounts at least 85% wt. The binder is a minor component and accounts less than 15% wt.

In embodiments, an electrode composition is disclosed. The electrode composition comprises electrode active material(s), filler(s) and isoprene rubber (IR) as electrode binder, wherein electrode active material, such as Si, Si alloys, Si compounds, Si composites, carbon black, or graphite, accounts for >85% wt., or >90% wt., or >94% wt., and wherein IR rubber is a minor component and accounts for <15% wt. or <10% wt., or <6% wt. In embodiments, the IR rubber is used as latex form, where particle size is <5 microns, or <2 microns, and more preferably less than one micron. In embodiments, the IR rubber is cross-linked, wherein cross-linking can be introduced during or after binder manufacture process, or during or after battery manufacturing process In embodiments, an electrode composition is disclosed. The electrode composition comprises electrode active material(s), filler(s) and silicone-containing block copolymer as electrode binder, wherein electrode active material, such as Si, Si alloys, Si compounds, Si composites, carbon black, or graphite, accounts for >85% wt., or >90% wt., or >94% wt., and wherein silicone-containing block copolymer is a minor component and accounts for <15% wt. or <10% wt., or <6% wt. In embodiments, the silicone-containing block copolymer has at least two blocks, and could be a linear polymer, a radial polymer or a star polymer, and wherein silicone-containing block copolymer has elongation at break (according to ASTM D412) of >400%, or >600%, and or >800%. In embodiments, the silicone-containing block copolymer is cross-linked, wherein cross-linking can be introduced during or after binder manufacture process, or during or after battery manufacturing process.

In embodiments, an electrode composition is disclosed. The electrode composition comprises electrode active material(s), filler(s) and electronically conductive block copolymer as electrode binder, wherein electrode active material, such as Si, Si alloys, Si compounds, Si composites, carbon black, or graphite, accounts for >85% wt., or >90% wt., or >94% wt., and wherein electronically conductive block copolymer is a minor component and accounts for <15% wt. or <10% wt., or <6% wt. In embodiments, the electronically conductive block copolymer contains a block that is dehydrogenated CHD (cyclohexadiene) block, i.e., polyphenylene block, and wherein polyphenylene-containing block copolymer has at least two blocks, and could be a linear polymer, a radial polymer or a star polymer, and wherein electronically conductive block copolymer has elongation at break (according to ASTM D412) of >400%, or >600%, and or >800%. In embodiments, the unhydrogenation level of CHD (cyclohexadiene) block is at least 50%, preferably at least 70%, more preferably at least 90%.

In embodiments, an electrode composition is disclosed. The electrode composition comprises electrode active material(s), filler(s) and ionically conductive block copolymer as electrode binder, wherein electrode active material, such as Si, Si alloys, Si compounds, Si composites, carbon black or graphite, accounts for >85% wt., or >90% wt., or >94% wt., and wherein ionically conductive block copolymer is a minor component and accounts for <15% wt. or <10% wt., or <6% wt. In embodiments, the ionically conductive block copolymer has elongation at break (according to ASTM D412) of >400%, or >600%, and or >800%.

In embodiments, an electrode composition is disclosed. The electrode composition comprises electrode active material(s), fillers and an electrode binder, wherein wt. % of electrode material, such as Si, Si alloys, Si compounds, Si composites, carbon black or graphite is >85% wt., or >90% wt., or >94% wt., and wt. % of electrode binder is a minor component, accounting for <15% wt. or <10% wt., or <6% wt., and wherein the binder is a block copolymer and wraps around electrode active materials. In embodiments, the electrode "wrapper" block copolymer has elongation at break (ASTM D412) of >400%, or >600%, and or >800%, and wherein the "wrapper" block copolymer can be chosen from USBC, HSBC, functionalized SBC, SBC blends, IR latex, silicone-containing block copolymer, conductive block copolymer, and others.

In embodiments, an electrode composition is disclosed. The electrode composition comprises electrode active material, filler(s) and an electrode binder, wherein electrode active material, such as Si, Si alloys, Si compounds, Si composite, carbon black or graphite, accounts for >85% wt., or >90% wt., or >94% wt., and wherein electrode binder is a minor component and accounts for <15% wt. or <10% wt., or <6% wt., and wherein the active electrode material(s) and binder(s) form a pie hollow fiber structure, or a tipped trilobal fiber structure, or a sheath-core fiber structure, or islands in the sea fiber structure. In embodiments, the binder can be any of the above-described block copolymers. In embodiments, a process of making the electrode composition is by fiber spinning, wherein fiber spinning can be melt spinning or solution spinning.

In embodiments, a dry process for making electrode reeling stock without the use of water or solvent(s) is disclosed. The electrode comprises of electrode active material(s), fillers and the electrode binder of any of claims 1-5, wherein wt. % of electrode material, such as Si, Si alloys, Si compounds, Si composites, carbon black, or graphite is >85% wt., and wt. % of electrode binder is a minor component, accounting <15% wt., or <10% wt., or <6% wt. In aspects, the dry process is extrusion or fiber spinning.

DESCRIPTION

The following terms will be used throughout the specification and will have the following meanings unless otherwise indicated.

"At least one of [a group such as A, B, and C]" or "any of [a group such as A, B, and C]" means a single member from the group, more than one member from the group, or a combination of members from the group. For example, at least one of A, B, and C includes, for example, A only, B only, or C only, as well as A and B, A and C, B and C; or A, B, and C, or any other all combinations of A, B, and C.

A list of embodiments presented as "A, B, or C" is to be interpreted as including the embodiments, A only, B only, C only, "A or B," "A or C," "B or C," or "A, B, or C."

"Conjugated diene" refers to an organic compound containing conjugated carbon-carbon double bonds and a total of 4 to 12 carbon atoms, such as 4 to 8 carbon atoms, which can be any of 1,3-butadiene and substituted butadienes, including but not limited to 1,3-cyclohexadiene, isoprene, 2,3-dimethyl-1,3-butadiene, 1-phenyl-1,3-butadiene, 1,3-pentadiene, 3-butyl-1,3-octadiene, chloroprene, and piperylene, or any combination thereof. In embodiments, the conjugated diene block comprises a mixture of butadiene and isoprene monomers. In embodiments, 1,3-butadiene alone is used.

"Butadiene" refers to 1,3-butadiene.

"Monovinyl arene," or "monoalkenyl arene," or "vinyl aromatic" refers to an organic compound containing a single carbon-carbon double bond, at least one aromatic moiety, and a total of 8 to 18 carbon atoms, such as 8 to 12 carbon atoms. Examples include any of styrene, o-methyl styrene, p-methyl styrene, p-tertbutyl styrene, 2,4-dimethyl styrene, alpha-methyl styrene, vinyl naphthalene, vinyltoluene, vinylxylene, adamantyl styrene, vinylanthracene, or mixtures hereof. In embodiments, the monoalkenyl arene block comprises a substantially pure monoalkenyl arene monomer. In some embodiment, styrene is the major component with minor proportions (less than 10 wt. %) of structurally related vinyl aromatic monomers such as o-methylstyrene, p-methyl styrene, p-tert-butyl styrene, 2,4-dimethyl styrene, a-methylstyrene, vinylnaphtalene, vinyl toluene, vinylxylene or combinations thereof. In embodiments, styrene alone is used.

"Residual unsaturation" or RU refers to the levels of unsaturation, i.e., carbon-carbon double bonds per gram of block copolymer. RU can be measured using nuclear magnetic resonance or ozonolysis titration. RU can also be calculated knowing the components in the block copolymer.

"Vinyl content" refers to the content of a conjugated diene that is polymerized via 1,2-addition in the case of butadiene, or via 3,4-addition in case of isoprene, resulting in a monosubstituted olefin, or vinyl group, adjacent to the polymer backbone. Vinyl content can be measured by nuclear magnetic resonance spectrometry (NMR).

"Coupling efficiency", expressed as % CE, is calculated using the values of the wt. % of the coupled polymer and the wt. % of the uncoupled polymer. The wt. % of the coupled polymer and the uncoupled polymer are determined using the output of the differential refractometer detector. The intensity of the signal at a specific elution volume is proportional to the amount of material of the molecular weight corresponding to a polystyrene standard detected at that elution volume. The area under the curve spanning the MW range corresponding to coupled polymer is representative of the % wt. coupled polymer, and likewise for the uncoupled polymer. % CE is given by 100 times (wt. % of coupled polymer/wt. % of coupled polymer+wt. % of uncoupled polymer). Coupling efficiency can also be measured by calculating data from GPC, dividing the integrated areas below the GPC curve of all coupled polymers (including two-arm, three-arm, four arm, etc. copolymers) by the same of the integrated areas below the GPC curve of both coupled and uncoupled polymers.

"Coupling Agent" or "X" refers to the coupling agents commonly used in making styrenic block copolymers (SBC), e.g., silane coupling agents, polyvinyl compounds, polyvinyl arene, di- or multivinylarene compounds; di- or multiepoxides; di- or multiisocyanates; di- or multialkoxysilanes; di- or multiimines; di- or multialdehydes; di- or multiketones; alkoxytin compounds; di- or multihalides, such as silicon halides and halosilanes; mono-, di-, or multianhydrides; di- or multiesters, etc.

"Polystyrene content" or PSC of a SBC refers to the % weight of vinyl aromatic, e.g., polystyrene in the SBC, calculated by dividing the sum of molecular weight of all vinyl aromatic blocks by the total molecular weight of the SBC. PSC can be determined using proton nuclear magnetic resonance (NMR).

"Controlled distribution" is defined as referring to a molecular structure having the following attributes: (1) terminal regions adjacent to the mono alkenyl arene homopolymer ("A") blocks that are rich in (i.e., having a greater than average amount of) conjugated diene units; (2) one or more regions not adjacent to the A blocks that are rich in (i.e., having a greater than average amount of) mono alkenyl arene units; and (3) an overall structure having relatively low blockiness, e.g., <40. "Rich in" is defined as greater than the average amount, e.g., 5% more than the average amount. Relatively low blockiness can be shown by the presence of a single glass transition temperature ("Tg"), intermediate between the Tg's of either monomer alone, either when analyzed using differential scanning calorimetry ("DSC") or proton NMR methods. "Styrene blockiness" can be measured using proton NMR and is defined to be the proportion of mono vinyl aromatic (S) units in the polymer having two S nearest neighbors on the polymer chain.

"Molecular weight" or "MW" refers to the styrene equivalent molecular weight in g/mol (unless otherwise indicated) of a polymer block or a block copolymer. MW can be measured with gel permeation chromatography (GPC) using polystyrene calibration standards, such as is done according to ASTM 5296-19. The GPC detector can be an ultraviolet or refractive index detector or a combination. The chromatograph is calibrated using commercially available polystyrene molecular weight standards. MW of polymers measured using GPC so calibrated are styrene equivalent molecular weights or apparent molecular weights. MW expressed herein is measured at the peak of the GPC trace-and commonly referred to as styrene equivalent "peak molecular weights," designated as $M_p$.

$M_n$ is the number average of the molecular weights, calculated according to:

$$M_n = \frac{\sum_i N_i M_i}{\sum_i N_i}$$

where $N_i$ is the number of molecules of molecular weight $M_i$. $M_n$ can be determined using GPC-SEC method in ASTM D5296 (2005).

"Predominant" when used in conjunction with a composition and a specific component e.g., monomer, means that the component is present in the composition in substantially pure form or a large amount e.g., >80, or >85, or >90, or >95 wt. %.

"Dispersed" or "dispersion" or "emulsion" refers to a two-phase system wherein one phase comprises finely divided particles distributed throughout a second phase, which is a bulk substance. The particles are the disperse or internal phase, and the bulk substance the continuous or external phase. The continuous phase can be water, an aqueous mixture, or an organic mixture. By "dispersion," it is also meant that not necessarily all of the composition or a component needs to be water insoluble.

"Df" refers to dissipation factor or loss tangent, a measure of loss rate of electrical energy in a dissipative system.

"Dk" refers to dielectric constant or permittivity.

"Electrochemical cell," refers to, for example, a "rechargeable battery," or a "battery cell," including a positive electrode, a negative electrode, and an electrolyte therebetween and in direct contact therewith which conducts ions (e.g., $Na^+$, $Li^+$) but electrically insulates the positive and negative electrodes. In embodiments, a battery may include multiple positive electrodes and/or multiple negative electrodes in one container.

"Positive electrode," refers to the electrode in a secondary battery towards which positive ions, e.g., $Li^+$, conduct, flow or move during discharge of the battery.

"Negative electrode" or "anode," referring to the electrode in a secondary battery from where positive ions, e.g., $Li^+$, flow or move during discharge of the battery.

"Composite electrolyte" refers to an electrolyte having at least two components, a solid-state electrolyte, and a binder that bonds to or adheres to the electrolyte, or uniformly mixed with the electrolyte.

"Solid state electrolyte" refers to a material suitable for electrically isolating the negative and positive electrodes, while also providing a conductive pathway for ions such as lithium, sodium, etc.

"Anolyte" is the electrolyte on the anode side of an electrochemical cell. Anolyte can be mixed with, layered upon, or laminated to an anode material.

"Sulfide electrolyte," refers to an inorganic solid-state material that conducts ions but is substantially electronically insulating. Examples include lithium, phosphorus, and sulfur and optionally additional element(s), such as Ge, Sn, Sn, As, Al, and Si.

"Binder" refers to a material that assists in the adhesion of another material, and/or assists in film formation, the binder composition comprises, consists essentially of, or consists of a styrene block copolymer ("SBC").

The disclosure relates to binders for use in rechargeable batteries, e.g., Lithium-ion batteries and beyond. The polymer binder comprises styrenic block copolymers (SBC) with properties including high elasticity (lower hysteresis) characteristics to accommodate large volume expansion/contraction in batteries, along with high adhesion properties. In embodiments, the binders are incorporated into unique structures for better performance in electrodes and/or electrolyte.

Styrenic Block Copolymer (SBC):

Unlike the SBR used as binder materials in the prior art, which is a random copolymer, SBC (styrenic block copolymer) is a block copolymer. Hard block (styrene) provides strength, while soft block (for example butadiene or isoprene) provides elasticity and adhesion. Because of the block structure, SBCs inherently have better strength, better elasticity, and adhesion than SBR, for battery properties, especially in charge/discharge cycling performance.

The SBC can be any of a linear, radial, or branched (multi-armed) block copolymer comprising at least one monovinyl aromatic block A, and at least one of a cyclo-conjugated diene block and a conjugated diene for block B, optionally a coupling agent residue X. In embodiments, SBC is unhydrogenated, hydrogenated, partially hydrogenated or selectively hydrogenated. The SBC has a molecular weight of 30,000-1,000,000, or 35,000-750,000, or 40,000-500,000, or 50,000-200,000.

In embodiments, block B is an unsaturated block, making the electron transfer to more efficient than the other type of polymers in the prior art like SBR, etc. In embodiments, the SBC has a residual unsaturation of 0.5-25 meq/g, or 0.5-20 meq/g, or 1-18 meq/g, or 2-15 meq/g, <25 meq/g, or <20 meq/g, or <15 meq/g, or <10 meq/g, or <8 meq/g, or <5 meq/g, or <3 meq/g, or >0.5 meq/g, or >1 meq/g, or >2 meq/g.

In embodiments, the SBC has a polystyrene content of <40 wt. %, or <35 wt. %, or <30 wt. %, or >5 wt. %, or >10 wt. %.

In embodiments, the SBC is sulfonated, i.e., having a sulfonate group, i.e., —$SO_3$, either in the acid form (—$SO_3H$, sulfonic acid) or a salt form (—$SO_3Na$). In embodiments, block B comprises at least one of cyclohexadiene butadiene and isoprene block copolymers, wherein the polybutadiene and polyisoprene soft blocks can be hydrogenated, and the polycyclohexadiene block can be either hydrogenated or unhydrogenated.

In embodiments, the SBC is a sulfonated block copolymer as disclosed in US Patent and Patent Publication Nos. US20070021569A1, U.S. Pat. Nos. 10,022,680, 8,263,713, 9,861,941, US20130102213A1, US20170107332A1, incorporated herein by reference. In embodiments, the SBC is a selectively sulfonated negative-charged anionic styrenic block copolymer. The term "selectively sulfonated" definition to include sulfonic acid as well as neutralized sulfonate derivatives. The sulfonate group can be in the form of metal salt, ammonium salt or amine salt. In embodiments, the sulfonated block copolymer has a general configuration A-B-A, (A-B)n(A), (A-B-A)n, $(A\text{-}B\text{-}A)_nX$, $(A\text{-}B)_nX$, A-D-B, A-B-D, A-D-B-D-A, A-B-D-B-A, $(A\text{-}D\text{-}B)_nA$, $(A\text{-}B\text{-}D)_nA$ $(A\text{-}D\text{-}B)_nX$, $(A\text{-}B\text{-}D)_nX$ or mixtures thereof; where n is an integer from 0 to 30, or 2 to 20; and X is a coupling agent residue. Each A and D block is a polymer block resistant to sulfonation. Each B block is susceptible to sulfonation. The plurality of A blocks, B blocks, or D blocks are the same or different.

Each A block comprises one or more segments selected from polymerized (i) para-substituted styrene monomers, (ii) ethylene, (iii) alpha olefins of 3 to 18 carbon atoms; (iv) 1,3-cyclodiene monomers, (v) monomers of conjugated dienes having a vinyl content less than 35 mol percent prior to hydrogenation, (vi) acrylic esters, (vii) methacrylic esters, and (viii) mixtures thereof. In embodiments, the block A is selected from para-substituted styrene monomers selected from para-methylstyrene, para-ethylstyrene, para-n-propylstyrene, para-iso-propylstyrene, para-n-butylstyrene, para-sec-butylstyrene, para-iso-butylstyrene, para-t-butylstyrene, isomers of para-decylstyrene, isomers of para-dodecylstyrene and mixtures thereof. Each B block comprises segments of one or more vinyl aromatic monomers. Each D block is selected from the group consisting of (i) a polymerized or copolymerized conjugated diene, (ii) a polymerized acrylate monomer, (iii) polymerized silicon, (iv) polymerized isobutylene and (v) mixtures thereof.

In embodiments, the block A has a relatively higher glass transition temperature, for example, >20° C., or >40° C., or >50° C., or >60° C., or >80° C., or >100° C., or 30-100° C., or 40-80° C., as compared to other polymer blocks in the SBC, which can lead to copolymers having desirable mechanical and other functional properties. In embodiments, the block A has a molecular weight ($M_p$) of 1000-60000 g/mol, or 2000-50000 g/mol, or 5000-45000 g/mol, or 8000-40000 g/mol, or 10000-35000 g/mol, or >1500 g/mol, or <50000 g/mol. In embodiments, the block A constitutes from 1-80 wt. %, or 5-75 wt. %, or 10-70 wt. %, or 15-65 wt. %, or 20-60 wt. %, or 25-55 wt. %, or 30-50 wt. %, or >10 wt. %, or <75 wt. %, based on the total weight of the SBC. In embodiments, the block A has from 0-25 wt. %, or 2-20 wt. %, or 5-15 wt. %, of the vinyl aromatic monomers such as those present in the B block. In embodiments, the A block has the degree of sulfonation of 0-15 mol %, or 2-12 mol %, or 5-10 mol %.

In embodiments, the block B comprises polymerized units of vinyl aromatic monomers selected from unsubstituted styrene, ortho-substituted styrene, meta-substituted styrene, alpha-methylstyrene, 1,1-diphenylethylene, 1,2-diphenylethylene, and mixtures thereof. In embodiments, the block B has a degree of sulfonation of 10-100 mol %, or 15-95 mol %, or 20-90 mol %, or 25-85 mol %, or 30-80 mol %, or 35-75 mol %, or 40-70 mol % or >15 mol % or <85 mol % of sulfonic acid or sulfonate ester functional groups, based on the number of monomer units or the block to be sulfonated. In embodiments, the block B has a molecular weight ($M_p$) of 10000-300000 g/mol, or 20000-250000 g/mol, or 30000-200000 g/mol, or 40000-150000 g/mol, or 50000-100000 g/mol, or 60000-90000 g/mol, or >15000 g/mol, or <150000 g/mol. In embodiments, the block B constitutes from 10-80 wt. %, or 15-75 wt. %, or 20-70 wt. %, or 25-65 wt. %, or 30-55 wt. %, or >10 wt. %, or <75 wt. %, based on the total weight of the SBC. In embodiments, the block B has from 0-25 wt. %, or 2-20 wt. %, or 5-15 wt. %, of the para-substituted styrene monomers such as those present in the A block.

In embodiments, the block D comprises a polymer or copolymer of a conjugated diene selected from isoprene, 1,3-butadiene, 2,3-dimethyl-1,3-butadiene, 1-phenyl-1,3-butadiene, 1,3-pentadiene, 1,3-hexadiene, 3-butyl-1,3-octadiene, farnesene, myrcene, piperylene, cyclohexadiene and mixtures thereof. In embodiments, the block D has a $M_p$ of 1000-60000 g/mol, or 2000-50000 g/mol, or 5000-45000 g/mol, or 8000-40000 g/mol, or 10000-35000 g/mol, or 15000-30000 g/mol, or >1500 g/mol, or <50000 g/mol. In embodiments, the block D constitutes from 10-80 wt. %, or 15-75 wt. %, or 20-70 wt. %, or 25-65 wt. %, >10 wt. %, or <75 wt. %, based on the total weight of the SBC.

In embodiments, sulfonation occurs at the phenyl ring of the polymerized styrene units in the B block, predominantly para to the phenyl carbon atom bonded to the polymer backbone. In embodiments, the block B has a degree of sulfonation of 10-100 mol %, or 15-95 mol %, or 20-90 mol %, or 25-85 mol %, or 30-80 mol %, or 35-75 mol %, or 40-70 mol % or >15 mol % or <85 mol % of sulfonic acid or sulfonate ester functional groups, based on the number of monomer units or the block to be sulfonated. In embodiments, the sulfonated polymer has a degree of sulfonation of >25 mol %, or >50 mol %, or <95 mol %, or 25-70 mol %. Degree of sulfonation can be calculated by NMR or ion exchange capacity (IEC).

In embodiments, the SBC is a midblock-sulfonated triblock copolymer, or a midblock-sulfonated pentablock copolymer, e.g., a poly(p-tert-butylstyrene-b-styrenesulfonate-b-p-tert-butylstyrene), or a poly[tert-butylstyrene-b-(ethylene-alt-propylene)-b-(styrenesulfonate)-b-(ethylene-alt-propylene)-b-tert-butylstyrene.

In embodiments, the sulfonated block copolymer has a $M_p$ of 25000-500000, or 30000-450000, or 35000-400000, or 40000-350000, or 45000-300000, or 50000-250000, or >35000, or <350000 g/mol. In embodiments, the SBC has an ion exchange capacity (IEC) of >0.5 meq/g, or >0.75 meq/g, or >1.0 meq/g, or >1.5 meq/g, or >2.0 meq/g, or >2.5 meq/g, or <5.0 meq/g. In embodiments, the SBC has a pH of <6, or <5, or <4, or <3, or <2.75, or <2.5, or <2.25, or <2, or <1.75, or <1.5, or <1.25.

In embodiments, the SBC is an unhydrogenated block terpolymer as disclosed in No. U.S. Pat. No. 7,704,676, incorporated herein by reference. The unhydrogenated block terpolymer in embodiments has a general structure A-I-B-I-A or $(A\text{-}I\text{-}B)_n$-X. Each A block is independently a vinyl aromatic compound. Each I is predominantly isoprene. Each B is predominantly butadiene. X is coupling agent residue, and n is an integer >=2. In embodiments, the weight ratio of I to B ranges from 30:70 to 70:30. The B block has a 1,2-vinyl bond content in the range of from 20 to 90%, or at least 30%. The PSC is from 10-45%, or 15-35%, or at least 25%. The A block has a molecular weight in the range of 5,000-20,000, or 5,000-15,000, or 10,000-20,000. The I and B blocks together have a molecular weight of 50,000-200,000, or 100,000-200,000, or 50,000-150,000. In embodiments, the uncoupled triblock, A-I-B content is in the range of from about 2% to about 95%, or at least 90%.

In embodiments, the SBC is in a form of aqueous dispersion such as isoprene rubber latex, having two or more polystyrene blocks containing less than 5 wt. % of copolymerizable monomer based on the weight of the polystyrene block, and at least one block of polyisoprene containing less than 5 wt. % of copolymerizable monomer based on the weight of block polymerized conjugated diene. The SBC has a weight average MW of 170,000 to 350,000, or 180,000 to 300,000 or at least 200,000 or <275,000. The polystyrene blocks have a weight average MW of 8,000 to 15,000, and with PSC in the block copolymer of 5-25 wt. %. Each B block consists of isoprene, with a weight average MW of 30,000 to 200,000, or <150,000 or <100,000, or 40,000 to 70,000.

In embodiments, the SBC comprises at least two blocks (A) of polymerized mono alkenyl arene and at least one block (B) of polymerized conjugated diene, with the blocks being arranged in a linear fashion or in a radial fashion, as disclosed in US Patent Publication No. US202010394404, incorporated herein by reference. In embodiments, the SBC has a general configuration, as A-B-A or A-B-X-(B-A)n, where X represents the residue of a coupling agent, and n is an integer=>2 representing the average number of arms in the radial structure. In embodiments, the coupling efficiency is >90%, or 92-100%. In the radial block copolymer structure, the A blocks have a MW of 10,000-12,000. The B blocks have a MW of 75,000-150,000, or 80,000-120,000. The total amount of the A blocks in the finished block polymer is 8-15 wt. %, or 10-12 wt. %. In the linear block copolymers, each A block has a MW of 8,000 to 15,000, or 9,000 to 14,000. The total molecular weight of the block copolymer is 150,000-250,000, or 170,000-220,000. The block copolymer has a monoalkenyl arene content of 8 wt. % to 15 wt. %, or 9 wt. % to 14 wt. %, based on the total weight of the block copolymer. In embodiments, the copolymer is a SIS (styrene-isoprene-styrene) block copolymer containing 15-30 wt. % styrene and 70-85 wt. % isoprene and having a MW of 30,000 to 200,000. In embodiments, the copolymer has the formula A-B-Xm-(B-A)n, with A, B, X, n as defined above, and with A having a MW of 8,000 to 15,000, B having a MW from 30,000 to 200,000, m is 0 or 1, and n is an integer from 1 to 5. In embodiments, the copolymer is a mixture comprising from 60 wt. % to 10 wt. % of a radial styrenic block copolymer and from 40 wt. % to 90 wt. % of a styrene diene diblock copolymer. The styrene diene diblock copolymer is a styrene isoprene diblock copolymer and/or a styrene butadiene diblock copolymer. When the diblock copolymer is a styrene butadiene diblock copolymer, it has a PSC of 10-30 wt. %.

In embodiments, the SBC is a linear block copolymer of the formula A-B-A. Each B block is predominantly butadiene. Each A block is a monovinyl aromatic. The PSC ranges from 20-50%, or 25-40%, or at least 30%. The MW is in the range of 50,000 to 200,000, or 110,000 to 175,000, or at least 125,000. The vinyl bond content is in the range of 20-60%, or at least 25%, or 35-50%. The triblock content is at least 85%, or at least 90%.

In embodiments, the SBC is an unhydrogenated radial block copolymer having a general structure $(A\text{-}B)_n$-X, with n ranging from 3 to 4, X is coupling agent residue. The A blocks are polymer blocks of monovinyl aromatic. The B blocks are polymer blocks of conjugated dienes. The PSC content ranges from 20 to 30%. In embodiments, the SBC has a MW of 250,000-400,000; or 300,000-370,000.

In embodiments, the SBC is a block copolymer with least one A block and at least one B block, as disclosed in U.S. Pat. No. 7,169,848, incorporated herein by reference. In embodiments, the SBC has the general configuration of A-B, A-B-A, (A-B)n (A-B-A)n (A-B-A)nX, (A-B)nX or mixtures thereof. X is coupling agent residue, and n is an integer from 2 to about 30. In embodiments, the SBC is a tetrablock having a structure $A_1$-$B_1$-$A_2$-$B_2$. Each A, $A_1$, and $A_2$ block is a mono alkenyl arene polymer block. Each B and $B_1$ block is a controlled distribution copolymer block of at least one conjugated diene and at least one monoalkenyl arene. Each $B_2$ block is selected from the group consisting of (i) a controlled distribution copolymer block of at least one conjugated diene and at least one mono alkenyl arene, (ii) a homopolymer block of a conjugated diene, and (iii) a copolymer block of two or more different conjugated dienes. Each A, $A_1$, and $A_2$ block independently has a MW between 3,000 and 60,000. Each B and $B_1$ block independently has a MW between about 30,000 and about 300,000. Each $B_2$ block independently has a MW between 2,000 and 40,000. Each B and $B_1$ block comprise terminal regions adjacent to the A blocks that are rich in conjugated diene units and one or more regions not adjacent to the A blocks that are rich in mono alkenyl arene units. In embodiments, the block copolymer further comprises at least a C block. Each C block is polymer block of one or more conjugated dienes, each having a MW between 2,000 and 200,000. The total amount of mono alkenyl arene in the block copolymer is 20 wt. % to 80 wt. %. The total amount of mono alkenyl arene in each B and $B_1$ block is between 10 wt. % and 75 wt. %. In embodiments, subsequent to hydrogenation, 0-10% of the arene double bonds are reduced, and at least 90% of the conjugated diene double bonds are reduced. If desired, the A and $A_1$ blocks may be fully saturated such that at least 90% of the arene double bonds have been reduced. Also, if desired, the saturation of the diene blocks may be reduced such that anywhere from 25 to 95% of the diene double bonds are reduced.

In embodiments, the SBC is a hydrogenated block copolymer of the formula A-B-A, $(A\text{-}B)_n$X. X is coupling agent residue. n has a value of 3. Before hydrogenation, each B block is a polymer of conjugated dienes, and each A block is a polymer of vinyl aromatic. The PSC ranges from 13-25%, or 20-23%, or >18%. The MW is in the range of 100,000 to 200,000, or 110,000 to 175,000, or >125,000. The vinyl bond content is in the range of 60-90%, or >60%, or 65-75%.

In embodiments, the SBC is a hydrogenated or unhydrogenated block copolymers comprising 1,3-cyclohexadiene monomer (CHD). In embodiments, the SBC comprising CHD has a general configuration of: A-B, $(A\text{-}B)_nX$, A'-B, $(A'\text{-}B)_nX$, A-B-A, A'-B-A', A-B-A', or A-B-C, where n is an integer from 2 to 30, and X is a coupling agent residue. Each A block is a poly(1,3-cyclodiene) homopolymers. Each A' block is a poly(1,3-cyclodiene-co-monoalkenyl arene) random copolymer. Each B block is a poly(acyclic conjugated diene) polymer comprising polymerized units of at least one acyclic conjugated diene. In embodiments, the B block is hydrogenated. Each C block is a poly(alkenyl arene) polymer. Each A, A' and C block independently has an average molecular weight of 2,000-60,000 or 2,500-50,000 or 3,000-30,000. Each B block has an average molecular weight of 1,000-300,000 or 2,000-100,000 or 2,500-75,000 or 3,000-50,000.

In embodiments, the SBC is a poly(1,3-cyclohexadiene) homopolymer, as disclosed in US Patent Publication No. 2021-0309773, incorporated herein by reference. In embodiments, the SBC has a Mn of 2,000-15,000, or 3,500-12,500, or 5,000-10,000, or >2,000, or >3,000, or >5,000 or <15,000, or <10,000. In embodiments, the SBC has a MW of 5,000-15,000, or 7,000-12,000, or <10,000, or >6,000, or >4,000. In embodiments, the SBC has a polydispersity index of 3.0-8.0, or 4.0-6.0, or >4.5, or <7.0, or 3.5-7.0.

In embodiments, the SBC is a copolymer formed by cationic polymerization of one or more cyclic dienes, and a comonomer, as disclosed in US Patent Publication No. 2021-0309779, incorporated herein by reference. The comonomer is selected from the group consisting of a monoterpene, a branched styrene, and combinations thereof. The one or more cyclic dienes is selected from the group consisting of 1,3-cyclohexadiene (CHD), cyclopentadiene (CPD), 1,3-cycloheptadiene, 4,5,6,7-tetrahydroindene, norbornadiene (NBD), and combinations thereof. In embodiments, the SBC has a Mn of 2,000-15,000, or 3,500-12,500, or 5,000-10,000, or >2,000, or >3,000, or >5,000, or <15,000, or <10,000. In embodiments, the SBC has a Mz of 2,000-30,000, or 3,000-25,000, or <20,000, or <18,000, or >2,500, or >3,000.

In embodiments, the SBC is a star-branched copolymer, as disclosed in US Patent Publication No. 2020-0347168, incorporated herein by reference. Each polymer arm comprises polymerized units (i) derived from a first vinyl aromatic monomer comprising a radical-reactive group, wherein from greater than 10 mol % to 100 mol % of polymerized units (i) are unhydrogenated and optionally, polymerized units (ii) comprising (iiA) hydrogenated and unhydrogenated forms of polymerized units (ii) derived from a high Tg monomer having a Tg of up to 300° C., and (iiB) hydrogenated form of polymerized units (i) or hydrogenated form of polymerized styrene units; and optionally, polymerized units (iii), comprising (iiiA) hydrogenated form of polymerized units derived from one or more acyclic conjugated dienes, wherein less than 10 wt. % of (a) are unhydrogenated, and (iiiB) polymerized units derived from one or more of a second vinyl aromatic monomer. Each polymer arm of the star-branched polymer has a molecular weight Mp of from 1 kg/mol to 50 kg/mol. The copolymer has a peak molecular weight Mp of from 15 kg/mol to 500 kg/mol.

In embodiments, the SBC is further modified by graft-reacting (functionalized) with a functional group, chemically attached to either the styrene or the ethylene-butylene block chemically functional moieties.

In embodiments, the functional group is an unsaturated monomer having one or more saturated groups or their derivatives such as carboxylic acid groups and their salts, anhydrides, esters, imides, amides, or acid chloride groups, as disclosed in U.S. Pat. Nos. 7,169,848, 4,578,429, 5,506,299, 4,292,414, incorporated herein by reference. Examples include quaternary ammonium salt, carboxylic acid/salt, maleic acid, fumaric acid, itaconic acid, citraconic acid, acrylic acid, glycidyl acrylate, cyanoacrylates, hydroxy $C_1$-$C_{20}$ alkyl methacrylate's, acrylic polyethers, acrylic anhydride, methacrylic acid, crotonic acid, isocrotonic acid, mesaconic acid, angelic acid, maleic anhydride, itaconic anhydride, citraconic anhydride, acrylonitrile, methacrylonitrile, sodium acrylate, calcium acrylate, and magnesium acrylate.

In embodiments, the functional group for grafting is selected from a silane, a sulfonic acid, a phosphate, a phosphine oxide, a phosphoric acid, an alkoxide, a nitrile, a thioether, thiol, and combinations thereof. In embodiments, the SBC is modified by graft-reacting with silicon or boron containing compounds as taught by U.S. Pat. No. 4,882,384, incorporated herein by reference. An example is graft-reacting with an alkoxy-silane compound to form silane-modified block copolymer. In embodiments, the SBC is an epoxidized block copolymer as disclosed in U.S. Pat. No. 8,927,657B2, incorporated herein by reference, wherein the double bonds of the conjugated diene group are epoxidized.

The SBC is available for use in binders in various forms, including but not limited to powder, pellets, crumb, in solution, gel, membrane or film, suspension, aqueous dispersions, aqueous emulsions, or in latex form. In embodiments, the SBC is employed in water suspension or in latex form, with the polymers being of reduced particle size, e.g., micron and submicron range.

In embodiments, the SBC has a particle size of 0.05-20.0 μm, or 0.05-15 μm, or 0.1-10 μm, or 0.2-5 μm, or 0.2-5 μm, or 0.5-3 μm. Small particle size may potentially to offer better adhesion and surface/crack protection of electrode particles, such as Si or Si alloys, Si compounds or Si composite.

In embodiments, the amount of SBC polymer in the binder ranges is >20 wt. %, or >30 wt. %, or >40 wt. %, or 20-99 wt. %, or 25-95 wt. %, or 30-90, wt. %, or 35-85 wt. %, based on the total weight of the binder composition.

Optionally Modified SBC.

In embodiments, the SBC is first suspended in a solvent generating a colloidal suspension, then optionally doped, or grafted with a chemical dopant to increase the conductivity property, e.g., increasing the local concentration of ions present in the conducting domain of the polymer. In embodiments, the chemical dopant comprises an ionic liquid, e.g., heterocyclic diazole-based ionic liquid, ionic liquid comprising imidazole-type cations, alkyl-substituted imidazolium, pyridinium, pyrrolidinum cation, or combination thereof. The amount of polymerized ionic liquid block in embodiments ranges from 5 to 70 mol %, or at least 10 mol % of the total SBC.

In some embodiments where the SBC contains CHD (1,3-cyclohexadiene), the SBC can be made intrinsically conductive by dehydrogenating PCHD (poly(1,3-cyclohexadiene)) into a conjugated polymer or a semi-conducting polymer, i.e., polyphenylene. In other embodiments, the SBC is made intrinsically conductive by graft-copolymerizing with aniline onto the polystyrene blocks. The aniline polymer which is a conjugated homo- or copolymer made up of at least an unsubstituted and/or substituted aniline, in embodiments is doped with a protic acid, the protic acid functionalizing it in such a way that the aniline polymer is melt-processible or solution-processible, lending itself to grafting.

Alternatively, or additionally in embodiments, the SBC is doped or made conductive with conductive fillers. In embodiments, the conductive filler comprises particles of a pure silver powder, acetylene carbon, carbon black, graphene, metal particles coated with silver on its surface or a mixture thereof, graphite, natural graphite, silver coated graphite particles, nickel coated graphite particles, gold coated graphite particles, or mixtures thereof. The particles have a mass median diameter (D50) of ~100 microns, and are selected from the group consisting of flakes, platelets, leaf-like particles, rods, tubes, fibers, needles, and dendritic particles. In embodiments, the conductive filler consists of carbon fibers having a length of from 5 to 100 microns.

In embodiments, the conductive fillers are carbon-based nanofillers, e.g., carbon nanotubes (CNTs). CNTs can be dispersed in the SBC via methods known in the art, e.g., US Patent Publication Nos. US20040186220A, US-2010/0009165-A, and WO-2010/007163-A, incorporated herein by reference. Known methods include but are not limited to solvent-assisted, polymer coating/wrapping, and non-wrapping processes.

In embodiments, the amount of conductive fillers range from 0.1 to 20 wt. %, 0.1 to 15 wt. %, or 1 to 10 wt. %, or <8 wt. %, or >1 wt. % of the total weight of the binder composition. In embodiments, the amount of conductive filler is present in a conductive filler to SBC weight ratio of 1:50 to 1:4, or 1:40 to 1:30, or 1:30 to 1:5, or 1:20 to 1:6, or 1:10 to 1:8.

In embodiments, in addition to, or instead of being modified with a conductive filler, the SBC is modified with the addition of IR rubber latex to improve binder properties, e.g., adhesion and elasticity. In embodiments, the IR rubber latex modified SBC is present in an amount of 10-20 wt. %, or <20 wt. %, or <15 wt. % or <10 wt. %, based on the total electrode composition.

In embodiments, instead of or in addition to the IR rubber latex, the SBC is modified with t silicone to further improve adhesion and elasticity. In embodiments, the silicone modified SBC is present in an amount of 10-20 wt. %, or <20 wt. %, or <15 wt. % or <10 wt. %, based on the total electrode composition.

Optional Tackifying Resin Component:

In some embodiments depending on the application, the binder composition optionally includes a tackifying resin. In embodiments, the tackifying resin comprises rosin resins selected from the group of modified rosin resins and rosin esters. Modified rosin resins comprise one or more component selected from the group of rosin acids, maleic anhydride or fumaric acid or maleic modified rosin esters (MMRE). Rosin acids, derived from trees as gum rosin, wood rosin, or tall oil rosin, are comprised of one or more component of the group consisting of abietic acid, neoabietic acid, dehydroabietic acid, levopimaric acid, pimaric acid, palustric acid, isopimaric acid, and sandarocopimaric acid. Rosin esters are comprised of one or more derivative obtained from the reaction of one or more rosin acids and one or more alcohol from the group of alcohols consisting of methanol, triethylene glycol, glycerol, and pentaerythritol.

In embodiments, the rosin ester resin is selected from hydrogenated hydrocarbon rosin esters, acrylic rosin esters, disproportionation rosin esters, dibasic acid modified rosin esters, polymerized resin esters, phenolic modified rosin ester resins, and mixtures thereof. In other embodiments, the binder comprises a mixture of maleic modified glycerol ester and pentaerythritol ester of rosin resins.

In embodiments, the binder comprises a hydrocarbon resin as a tackifier. Examples include resins selected from the group of C5 aliphatic hydrocarbon resins, C9 aromatic hydrocarbon resins, and C5/C9 hydrocarbon blend. C5 aliphatic hydrocarbon resins are produced from distillation reactions in the presence of a Lewis catalyst, of piperylene which comprises one or more components of the group of trans-1,3-pentadiene, cis-1,3-pentadiene, 2-methyl-2-butene, dicyclopentadiene, cyclopentadiene, and cyclopentene. C9 aromatic hydrocarbon resins are a byproduct of naphtha cracking of petroleum feedstocks used to produce C5 aliphatic resins, comprising one or more of the groups consisting of vinyltoluenes, dicyclopentadiene, indene, methylstyrene, styrene, and methylindenes.

In embodiments, the tackifying resin is selected from the group of maleated rosin ester, maleic modified glycerol rosin ester, fumarated rosin ester, acrylated rosin ester, amdidated rosin ester (amine modified), nitrated rosin ester, chlorinated rosin ester, brominated rosin ester, pentaerythritol ester of hydrogenated rosin, glycerol esters), hydrocarbon esters such as piperlyene and isoprene, both hydrogenated and not hydrogenated, styreneated hydrocarbon resins, and terpene based resins such as terpene phenolic, styreneated terpene, polyterpene resins, and mixtures thereof.

In embodiments, the tackifying resin is provided in an aqueous dispersion. In embodiments, the aqueous dispersion of the tackifying resin comprises a surfactant. Any desired surfactant, e.g., anionic surfactant, a cation surfactant, a nonionic surfactant, or a mixture thereof, can be used for making the aqueous tackifier dispersions.

In embodiments, the tackifying resin has a particle size of 0.3-3 μm, or 0.5-1.5 μm, or <3 μm, or >0.3 μm, or >0.5 μm.

In embodiments, the amount of optional tackifying resin in the binder ranges 0-70 wt. %, <30 wt. %, or from 20-70 wt. %, or from 25-50 wt. %, or >10 wt. %, or >5 wt. %, based on the total weight of the glue composition. In embodiments, the resin tackifier as relative to the SBC in the binder composition, is present in a weight ratio range of 10:90 and 50:50, or 20:80 and 80:20, or 20:80 and 40:60, or 45:50 and 40:60.

Optional Plasticizer Component:

Depending on the application, in some embodiments, the binder further comprises at least a plasticizer selected from the group of vegetable oils, process oils, mineral oils, phthalates and mixtures.

Process oils are comprised of one or more components of the group consisting of paraffinic oils, naphthenic oils, and aromatic oils. Paraffinic oils are saturated carbon backbones, naphthenic oils have polyunsaturated carbon structure with little aromatic content, and aromatic oils have cyclic carbon unsaturation resulting aromatic classification.

The amount of plasticizer in the binder ranges from 0 to 40 wt. %, or 5-35 wt. %, or less than 20 wt. %, based on the total weight of the binder material.

Properties:

In embodiments, the SBC has an elongation at break (according to ASTM D412) of >400%, or >600%, or >800%, or 200-2,000%, or 400-2,000%, or <2,000%, allowing the binder material to have high elasticity (low hysteresis). As the SBC is highly elastic, when used in a binder material for adding to an anode, e.g., a silicon anode, the binder helps relieve the stress of charging and discharging while holding the silicon particles together. The binder containing SBC is characterized as being elastic with low stress relaxation, high strength, and high elongation to break.

In embodiments, the SBC has a glass transition temperature (Tg) as low as possible, in the range of 30-90° C., or 40-90° C., or 50-80° C., 60-80° C., or >30° C., or <95° C., or <80° C., as measured by Dynamic Mechanical Analysis (DMA), according to ASTM 4065.

In embodiments, the SBC has a dielectric constant (Dk) of 2.2-3, or 2.2-2.8, or 2.2-2.5. In embodiments, the SBC has a dissipation factor (Df) of 0.001-0.01, or 0.001-0.05, or 0.001-0.001, or 0.001-0.005. Dk and Df are measured at 1 and 20 GHz, according to ASTM D2520.

In embodiments, the SBC for use in the binder composition is not crossed linked (as with binder materials of the prior art, e.g., SBR). In embodiments, the SBC is substantially free of gel, e.g., having <10%, or <5%, or <2%, or <1% gel content. Gel refers to a state of, or a material which is soft, semi-solid, or solid, e.g., as result of cross-linking.

In embodiments, the SBC is provided in an aqueous dispersion form, being essentially free of organic solvent, or containing no organic solvent.

In embodiments, the binder material comprising the SBC is characterized as having any of high mechanical strength, high adhesion to electrode particles and fillers, high electrical conductivity, high ionic conductivity, and combinations.

A binder material containing SBC can be melt extruded at low temperatures, even with additional components such as Si or Si alloys, Si compounds or Si composite, carbon black, or graphite slurries. They have good chemical resistance to acids and bases. Polar functionality can be introduced to the binder with functionalization/grafted SBC.

Methods for Making Binder Materials & Applications:

The binder material containing SBC is suitable for use in batteries, e.g., lithium-ion batteries, lithium-sulfur batteries, whether Si-based or C-based batteries, etc. The binder material containing SBC can be used for forming electrodes, e.g., positive as well as negative electrode, solid-state electrolyte, and anolyte.

The method for making binder material containing SBC depends on the end-use applications, e.g., electrodes or anolyte, the material used in the electrodes, e.g., graphite, carbon black, Li, Al, Si, Si alloys, Si composites, etc., such as lithium transition metal oxides, titanium oxide, nanographite, boron, boron carbide, silicon carbide, rare earth metal carbides, transition metal carbides, boron nitride, silicon nitride, rare earth metal nitrides, and transition metal nitrides, the components to be included in the binder material to address factors such as energy density, volume expansion, and the like.

In embodiments, the binder material containing SBC is for forming a

"springy" anolyte. Springy indicates compressible or flexible without breaking. In embodiments, the binder material containing a SBC, particularly a conductive SBC, is incorporated into a liquid gel with other materials such as carbon, nanoparticles (e.g., Ag, Mg, Si, Ni, Cu, Pt, C, etc., and combinations), nanowires, etc., forming a network of electrically conductive species & springy anolyte. Springy anolyte layers are more compressible during Li stripping as compared to rigid or stiff anolytes. With SBC binder materials, springy anolyte has some ability to deform without degrading and maintains mechanical integrity with deformation (as compared to stiff anolytes which crack or break with moderate deformation). In embodiments, ~90% of an anolyte composition containing SBC binder material will survive when subjected to 500 cycles of ~20% deformation.

In embodiments, the SBC is first mixed with materials including solid state inorganic electrolyte, e.g., lithium super ionic conductor, lithium phosphorus oxynitride, polyethylene glycol (PEG) and polyethyleneoxide/polypropyleneoxide, a sulfide electrolyte, a dispersant such as fish oil, phosphate esters, and the like, in a solvent such as acetonitrile, succinonitrile, toluene, benzene, ethyl ether, decane, undecane, dodecane, and mixtures thereof, forming a slurry or into a "green film" (before heat treatment). In some examples, the films are extruded in layers or deposited or laminated onto other composite electrolytes to build up several layers of a composite electrolyte. In embodiments, the films are sintered, by heating the electrolyte film or powder in the range from about 5° C. to about 1200° C. for about 1 to about 720 minutes. The electrolyte films in embodiments have a thickness of >10 nm, and <100 μm.

In embodiments, SBC aqueous dispersion and tackifying resin aqueous dispersion are combined before adding other components to form the binder. In embodiments, the binder composition containing SBC and other components, e.g., conductive materials, are dispersed in water for subsequent film forming, spraying as a coating, or laminating onto composite electrolytes, or a collector substrate to form an electrode. After coating, the battery electrode may be dried in a vacuum chamber or inert gas atmosphere.

In embodiments, the binder containing SBC is applied to wrap around Si particles to better control volume expansion, and to restore electrode particles, e.g., Si or Si alloys, Si compounds or Si composite, carbon black, graphite, etc., to (almost) original physical state after each charge/discharge cycle so that capacity fade is minimized. Although any silicon particle size may be useful, in some embodiments it is between 2 nm to 100 micrometers, or 0.1 nm to 1000 μm, or a mean diameter of 50-100 nm.

In embodiments with the SBC binder material comprising a sulfonated block copolymer, e.g., Nexar™ sulfonated polymer from Kraton Corporation, a universal rolling press method is used by rolling the sulfonated block copolymer in the membrane form onto a current collector, followed by thermal treatment to obtain an electrode.

In embodiments, a SBC material such as Nexar™ sulfonated polymer is electrospun into fibers. When pressing, the fibers adhere strongly to the current collector (e.g., Cu foil). After thermal treatment/carbonized, the Cu foil will form a strong connection with the SBC material. In embodiment, electrode particles are combined with the polymer forming polymeric composite prior to electrospinning. In other embodiments, the bi-component composite (electrode particles and SBC) can be made into fibers by extrusion fiber spinning into hollow fiber structures.

In other embodiments, slurries, solutions, polymer melts, dispersions, emulsions etc. are co-extruded into other types of structures, with a binder composition containing electrode materials as the major component (85-98 wt. %), and binders and conductive additives as the minor component (1-10 wt. %). After extrusion, the fibers can be dried (if necessary) and chopped to the desired length. The above hollow segmented structure is one of many structures that could be used, but others are available, e.g., tipped trilobal, sheath-core, shell core fiber, and islands in the sea fibers.

EXAMPLES

The following illustrative examples, summarize in Table 1, are non-limiting.

In the comparative examples, SBR is styrene-butadiene-rubber binder for Li-ion battery anode, commercially available from MTI Corporation, with 23-35% styrene, 70-72% butadiene, and 5% carboxyl, in emulsion form with a viscosity (NDJ-5S, 25° C.) of 100-250 mPa·s. CMC is carboxymethyl cellulose also from MTI Corporation, as powder form with viscosity average molar mass or Mv of 400,000.

Comparative Example 1

Active anode material (graphite), conductive aide (carbon black), and CMC are mixed first at high shear rate to achieve a smooth paste. Shear rate is reduced to less than 100 l/s, and SBR latex is then added to the paste. The paste is then coated onto a Cu foil using a doctor blade coating method. Electrode dry composition is as following: graphite 94%, carbon black 2%, CMC 1.5% and SBR 2.5%.

Comparative Example 2

Similar to comparative example 1, except electrode comprises of 89% graphite and 5% micron-size Si.

Example 1-10

The SBC binder for use in the Examples are as listed in Table 1. The SBC binder is first dissolved in toluene. The amount of toluene is adjusted so that final paste has viscosity about 3,000 cP. After SBC binder dissolution in toluene, active anode material(s) (graphite or graphite+Si) and conductive aid (carbon black) are then added to toluene solution under high shear. Ultrasonication may be added to achieve smooth paste, which is then coated onto Cu foil. Electrode dry composition is similar to the comparative examples, i.e., about 94% active anode materials, about 2% conductive aid and about 4% binder.

Example 11

It is similar to comparative example 1, except SBR is replaced by IR401.

TABLE 1

| | Binder Description | Anode Materials |
|---|---|---|
| Comparative Example 1 | CMC/SBR | Graphite |
| Comparative Example 2 | CMC/SBR | Graphite + 5% Si |
| Example 1 | SBC of CHD and butadiene, with 30% wt. of CHD, a MW of 50K, and RU < 25 meq/g. | Graphite |
| Example 2 | unhydrogenated SBC radial tri-block copolymer with 23% PSC, vinyl content of 38-42%, apparent MW of 305-355 kg/mol and RU of 14.3 meq/g. | Graphite |
| Example 3 | unhydrogenated SBC linear block copolymer with 30% PSC, vinyl content of >= 35%, apparent MW of 138-162 kg/mol, and RU of 13.0 meq/g. | Graphite |
| Example 4 | unhydrogenated SBS tri-block with 24% PSC and RU of 14.1 meq/g. | Graphite |
| Example 5 | Unhydrogenated SBS tri-block with 24% PSC, and RU of 14.1 meq/g. | Graphite + 5% Si |
| Example 6 | hydrogenated linear triblock copolymer with 33% PSC, number average molecular weight of > 130 kg/mol, and RU < 10 meq/g. | Graphite |
| Example 7 | unhydrogenated SBS tri-block with 17% PSC, and RU of 15.4 meq/g. | Graphite |
| Example 8 | unhydrogenated SBS tri-block with 12% PSC, and RU of 16.3 meq/g. | Graphite |
| Example 9 | unhydrogenated SBS tri-block with 8% PSC, and RU of 17.0 meq/g. | Graphite |
| Example 10 | sulfonated pentablock copolymer, and RU < 5 meq/g. | Graphite |
| Example 11 | anionically polymerized polyisoprene latex with a high cis-1,4 content of > 82% m, high molecular weight of 1,500,000-2,000,000 g/mol, a high linearity, and RU < 25 meq/g. | Graphite |

Making the Electrode:

The electrode paste as prepared is coated onto a copper foil (anode paste) or aluminum foil (cathode paste). The coating can be done using a knife coating method, with the coating thickness of about 300 microns. The coating is then calendared to about 35% porosity.

Fabricating Coin Cell:

A number of battery cells (coil cell type) are fabricated. For each cell, a 1.47 cm diameter disk is punched out from the laminate for use in the coin cell assembly as a working electrode. Lithium foil is used in making the counter electrode, cut as 1.5 cm diameter disk. A 2 cm diameter of porous polyethylene separator is placed on top of the working electrode. The cells are then dried at about 80° C. to 120° C. under vacuum for about 24 hours, and 1 M $LiPF_6$ in EC:DEC (ethylene carbonate:ethyl-methyl carbonates) in 1:1 weight ratio electrolyte is injected in the cells. The battery cells are ready for testing.

Testing Coin Cells:

The battery cells are put into a testing chamber at 25° C. In the tests, voltage and current data over time is recorded over a number of charge and discharge cycles. From these data, cell capacity, resistance, columbic efficiency, and other performance data, are derived. Unless otherwise noted, four cells will be used for each test, and the results are the average of four tests. Charge and discharge rate is C/10, unless otherwise note. Table 2 shows the delithiation capacities of the electrodes with different types of binders.

TABLE 2

| Lithiation Capacity (mAh/g) at different cycles | | | | | | | | | | |
|---|---|---|---|---|---|---|---|---|---|---|
| | Cycles | | | | | | | | | |
| Examples | 1 | 2 | 3 | 4 | 5 | 6 | 7 | 8 | 9 | 10 |
| Comparative Ex 1 | 380 | 370 | 364 | 360 | 357 | — | — | — | — | — |
| Comparative Ex 2 | 548 | 495 | 461 | 430 | 404 | 385 | 373 | — | — | — |
| Example 1 | 365 | 347 | 346 | 347 | 348 | — | — | — | — | — |
| Example 2 | 346 | 330 | 326 | 327 | 328 | 330 | 331 | 332 | 333 | 333 |
| Example 3 | 335 | 310 | 309 | 308 | 306 | 305 | 303 | 302 | 300 | 299 |
| Example 4 | 358 | 348 | 348 | 347 | 347 | — | — | — | — | — |
| Example 5 | 553 | 429 | 415 | 410 | 407 | 406 | 406 | — | — | — |

TABLE 2-continued

| Lithiation Capacity (mAh/g) at different cycles | | | | | | | | | | |
|---|---|---|---|---|---|---|---|---|---|---|
| | Cycles | | | | | | | | | |
| Examples | 1 | 2 | 3 | 4 | 5 | 6 | 7 | 8 | 9 | 10 |
| Example 6 | 310 | 230 | 211 | 196 | 183 | 171 | 162 | 154 | 149 | 145 |
| Example 7 | 346 | 331 | 331 | 332 | 332 | 334 | 336 | 336 | — | — |
| Example 8 | 356 | 336 | 335 | 334 | 334 | 334 | 334 | 334 | — | — |
| Example 9 | 348 | 331 | 331 | 330 | 328 | 328 | 328 | 328 | — | — |
| Example 10 | 373 | 342 | 340 | 340 | 341 | 341 | 341 | 342 | 342 | 342 |
| Example 11 | 270 | 320 | 270 | 225 | 190 | — | — | — | — | — |

Although the terms "comprising" and "including" have been used herein to describe various aspects, the terms "consisting essentially of" and "consisting of" can be used in place of "comprising" and "including" to provide for more specific aspects of the disclosure and are also disclosed.

We claim:

1. A binder composition for use in rechargeable batteries, the binder composition comprising:

at least 20 wt. % of a block copolymer having any of a linear, radial, or branched structure, the block copolymer comprising:

i) a monovinyl aromatic block, ii) a conjugated diene block, and iii) optionally a coupling agent residue, wherein the block copolymer has a residual unsaturation selected from:

(a) 10 to 18 meq/g when the block copolymer is unhydrogenated;

(b) 0.5 to 10 meq/g when the block copolymer is hydrogenated; or (c) 0.5 to 5 meq/g when the block copolymer is sulfonated;

up to 70 wt. % of a tackifying agent selected from hydrocarbon resins, alkyd resins, rosin resins, rosin esters and combinations thereof;

up to 40 wt. % of a plasticizer selected from vegetable oils, mineral oils, process oils, phthalates, and mixtures thereof.

2. The binder composition of claim 1, wherein the block copolymer is unhydrogenated.

3. The binder composition of claim 1, wherein the block copolymer has a polystyrene content of <40 wt. %.

4. The binder composition of claim 1, wherein the monovinyl aromatic is selected from the group of styrene, o-methylstyrene, p-methyl styrene, p-tert-butyl styrene, 2,4-dimethylstyrene, alpha-methylstyrene, vinylnaphthalene, vinyltoluene, vinylxylene, adamantyl styrene, vinylanthracene, vinyl biphenyl, 1,1-diphenylethylene, and mixtures thereof.

5. The binder composition of claim 1, wherein the conjugated diene block is butadiene.

6. The binder composition of claim 1, wherein the block copolymer is selected from the group of:

an unhydrogenated block terpolymer having a general structure A-I-B-I-A, or (A-I-B)n-X, wherein each A block is independently a vinyl aromatic compound, each I block is predominantly isoprene, and each B is predominantly butadiene, X is a coupling agent residue, and n is an integer >=2;

an unhydrogenated radial block copolymer having a general structure (A-B)n-X, with n ranging from 3 to 4, X is coupling agent residue, wherein the A blocks are polymer blocks of a vinyl aromatic, and the B blocks are polymer blocks of conjugated dienes;

a styrenic block copolymer having a general structure of A-B-A or A-B-X-(B-A)n, wherein each A is polymerized mono alkenyl arene and each B is polymerized conjugated diene, where X represents the residue of a coupling agent and n is an integer =>2 representing the average number of arms in the radial structure;

a block copolymer having a general structure of A-B, A-B-A, (A-B)n (A-B-A)n (A-B-A)nX, (A-B)nX, A1-B1-A2-B2 or mixtures thereof, wherein each A, A1, and A2 block is a mono alkenyl arene polymer block, and each B and B1 block is a controlled distribution copolymer block of at least one conjugated diene and at least one mono alkenyl arene, and each B2 block is selected from the group consisting of (i) a controlled distribution copolymer block of at least one conjugated diene and at least one mono alkenyl arene, (ii) a homopolymer block of a conjugated diene, and (iii) a copolymer block of two or more different conjugated dienes, where X is coupling agent residue, and n is an integer from 2 to 30;

a block copolymer is in a form of aqueous dispersion such as isoprene rubber latex, having two or more polystyrene blocks containing less than 5 wt. % of copolymerizable monomer based on the weight of the polystyrene block, and at least one block of polyisoprene containing less than 5 wt. % of copolymerizable monomer based on the weight of block polymerized conjugated diene;

a poly(1,3-cyclohexadiene) homopolymer having a Mn of 2,000-15,000, and a MW of 5,000-15,000;

a copolymer formed by cationic polymerization of one or more cyclic dienes selected from the group consisting of 1,3-cyclohexadiene (CHD), cyclopentadiene (CPD), 1,3-cycloheptadiene, 4,5,6,7-tetrahydroindene, norbornadiene (NBD), and combinations thereof, and a comonomer selected from the group consisting of a monoterpene, a branched styrene, and combinations thereof; and a star-branched copolymer, wherein each polymer arm comprises polymerized units (i) derived from a first vinyl aromatic monomer comprising a radical-reactive group, wherein from greater than 10 mol % to 100 mol % of polymerized units (i) are unhydrogenated and optionally, polymerized units (ii) comprising (iiA) hydrogenated and unhydrogenated forms of polymerized units (ii) derived from a high Tg monomer having a Tg of up to 300° C., and (iiB) hydrogenated form of polymerized units (i) or hydrogenated form of polymerized styrene units; and optionally, polymerized units (iii), comprising (iiiA) hydrogenated form of polymerized units derived from one or more acyclic conjugated dienes, and (iiiB) polymerized units derived from one or more of a second vinyl aromatic monomer.

7. The binder composition of claim 1, wherein the block copolymer is functionalized for a functionality selected from the group of maleation, epoxidation, silanation, carboxylic acid/salt, quaternary ammonium salt, and sulfonation.

8. The binder composition of claim 7, wherein the functionality is by any of post-polymerization functionalization, or by polymerizing monomers with functionality, and combinations thereof.

9. The binder composition of claim 1, wherein the block copolymer is in various forms, including but not limited to powder, pellet, crumb, in solution, suspension, aqueous dispersion, or in latex form.

10. The binder composition of claim 9, wherein the aqueous dispersion comprises a surfactant.

11. The binder composition of claim 1, wherein the block copolymer may be blended with other polymer, resins, and/or tackifier/adhesion promoter, which include but not limited to blends with polyamides, terpene/phenol resins, and rosin esters, which can be in latex form.

12. The binder composition of claim 1, wherein the block copolymer has a particle size of 0.05-20.0 μm.

13. The binder composition of claim 1, wherein the block copolymer has one or more of:

an elongation at break of >400%, a glass transition temperature (Tg) of 30-90° C.;

a dielectric constant (Dk) of 2.2-3; and a dissipation factor (Df) of 0.001-0.01.

14. An electrode composition comprising:

an electrode active material, a filler, and a binder comprising of claim 1;

wherein the electrode active material, selected from Si, Si alloys, Si compounds, Si composites, carbon black, and graphite, accounts at least 85% wt., based on the total weight of the electrode composition, and wherein the binder is a minor component and accounts less than 15% wt., based on the total weight of the electrode composition.

15. An electrode composition of claim 14, wherein the binder is selected from at least one of: isoprene rubbers (IR), silicone-containing block copolymers, electronically conductive block copolymers, and ionically conductive block copolymers.

16. A process of making electrode composition in claim 14 by fiber spinning, wherein fiber spinning can be melt spinning or solution spinning.

17. The binder composition of claim 1, wherein the conjugated diene comprises a cyclic conjugated diene and/or a cyclo-conjugated diene.

18. The binder composition of claim 1, wherein the block copolymer is hydrogenated.

* * * * *